(12) United States Patent
Shim

(10) Patent No.: US 12,615,148 B2
(45) Date of Patent: Apr. 28, 2026

(54) LATTICE-BASED PUBLIC KEY CRYPTOSYSTEM AND ELECTRONIC DEVICE INCLUDED IN THE SAME

(71) Applicant: INSTITUTE FOR BASIC SCIENCE, Daejeon (KR)

(72) Inventor: Kyung Ah Shim, Daejeon (KR)

(73) Assignee: INSTITUTE FOR BASIC SCIENCE, Daejeon (KR)

( * ) Notice: Subject to any disclaimer, the term of this patent is extended or adjusted under 35 U.S.C. 154(b) by 238 days.

(21) Appl. No.: 18/516,691

(22) Filed: Nov. 21, 2023

(65) Prior Publication Data

US 2025/0015992 A1     Jan. 9, 2025

(30) Foreign Application Priority Data

Jul. 6, 2023    (KR) ......................... 10 2023 0087668

(51) Int. Cl.
*H04L 9/30* (2006.01)
*H04L 9/08* (2006.01)
(52) U.S. Cl.
CPC .......... *H04L 9/3093* (2013.01); *H04L 9/0894* (2013.01)
(58) Field of Classification Search
CPC ............................. H04L 9/3093; H04L 9/0894

USPC ........................................................ 380/44
See application file for complete search history.

(56) References Cited

U.S. PATENT DOCUMENTS

| | | | |
|---|---|---|---|
| 2008/0069344 A1* | 3/2008 | Yao ....................... | H04L 9/0844 |
| | | | 713/171 |
| 2020/0153618 A1* | 5/2020 | Bhattacharya ........ | H04L 9/0841 |
| 2022/0014351 A1* | 1/2022 | Jung ..................... | H04L 9/0869 |

* cited by examiner

*Primary Examiner* — Linglan Edwards
*Assistant Examiner* — Phuc Pham
(74) *Attorney, Agent, or Firm* — Maschoff Brennan

(57) ABSTRACT

Embodiments of the present disclosure may include a key generation device of a lattice-based public key cryptosystem. In some embodiments, the key generation device may include a communication unit, a storage unit, and a processor that may be configured to control the key generation device to perform operations. In some embodiments, the operations may include generating a public key by using a public key polynomial, where the public key polynomial may belong to a first polynomial ring. In some embodiments, the operations may additionally include generating a secret key that may correspond to the public key. In some embodiments, the secret key may be generated by using a secret key polynomial that may belong to a second polynomial ring. In some embodiments, the operations may additionally include storing the public key and the secret key.

12 Claims, 3 Drawing Sheets

【Fig. 1】
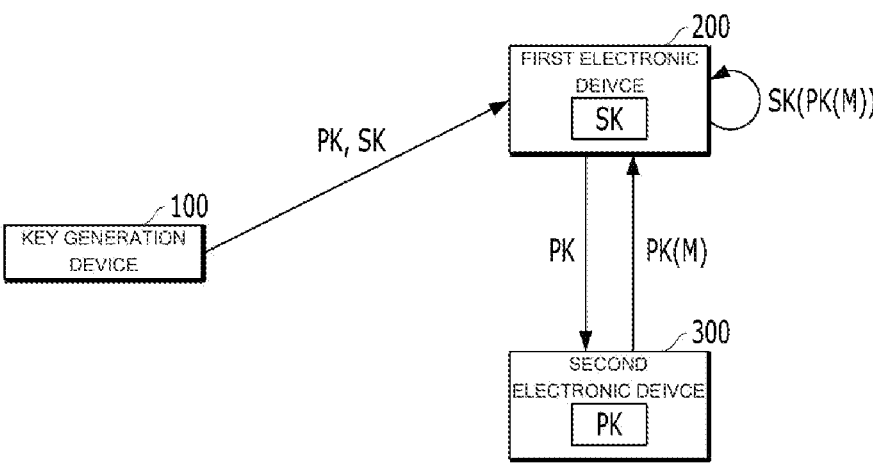
【Fig. 2】
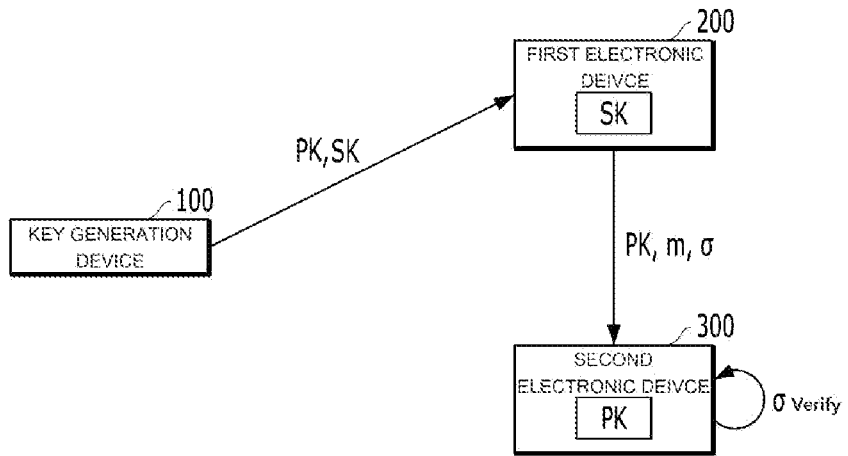

【Fig. 3】
400
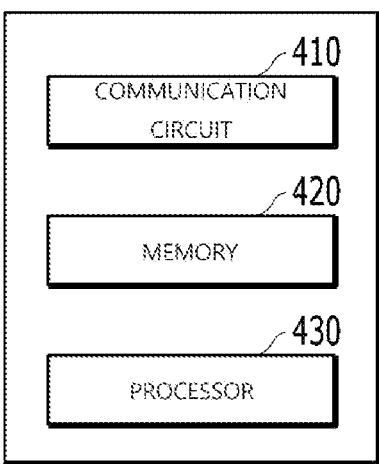
【Fig. 4】
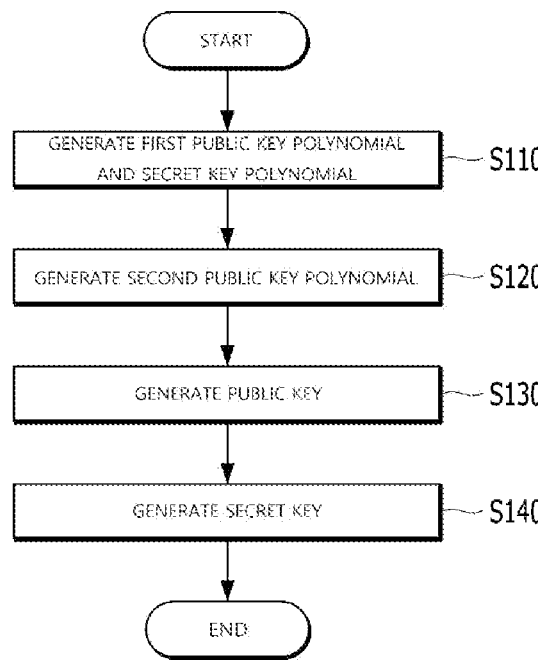

【Fig. 5】
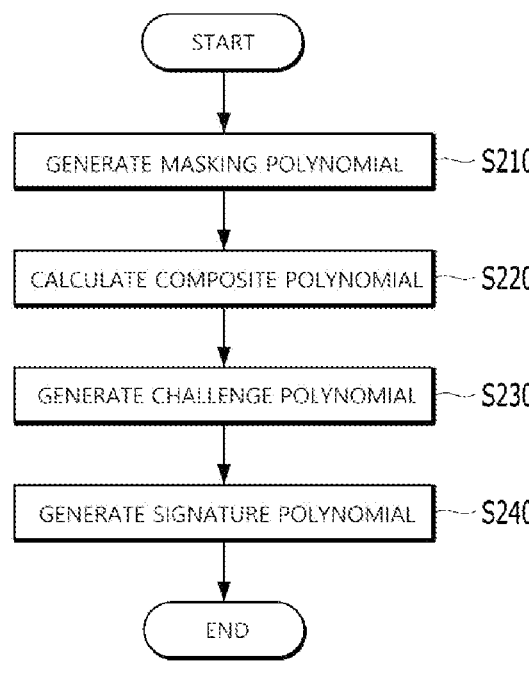
START
GENERATE MASKING POLYNOMIAL — S210
CALCULATE COMPOSITE POLYNOMIAL — S220
GENERATE CHALLENGE POLYNOMIAL — S230
GENERATE SIGNATURE POLYNOMIAL — S240
END
【Fig. 6】
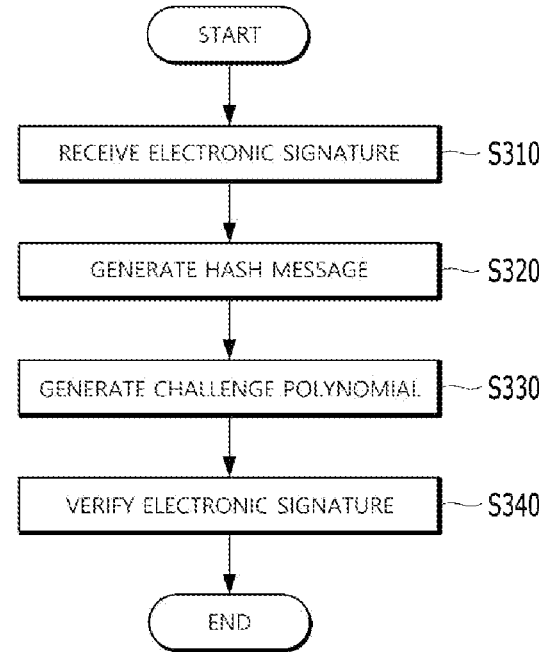
START
RECEIVE ELECTRONIC SIGNATURE — S310
GENERATE HASH MESSAGE — S320
GENERATE CHALLENGE POLYNOMIAL — S330
VERIFY ELECTRONIC SIGNATURE — S340
END

LATTICE-BASED PUBLIC KEY CRYPTOSYSTEM AND ELECTRONIC DEVICE INCLUDED IN THE SAME

TECHNICAL FIELD

Embodiments of the present disclosure relate to a public key cryptosystem and an electronic device included in the same, and specifically, to a lattice-based public key cryptosystem and an electronic device included in the same.

BACKGROUND ART

Recently, most messages are transmitted and received through electronic communications. Accordingly, an interest in a cryptosystem for encrypting a message is in an increasing tendency so that the message is not exposed to a third person as it is in such a process.

The cryptosystem may be briefly divided into a symmetric-key cryptosystem and an asymmetric-key cryptosystem. The symmetric-key cryptosystem includes an encryption key and a decryption key which are in the same way, and the asymmetric-key cryptosystem includes an encryption key and a decryption key which are in different ways. For example, in the asymmetric-key cryptosystem, a sender encrypts the message with a receiver's public key, and a receiver decrypts the encrypted message with the receiver's own secret key.

Meanwhile, the asymmetric-key cryptosystem is utilized for an electronic signature. The electronic signature is to prove integrity of the message, and means to identify whether the corresponding message has been sent from a true sender without being forged or altered (i.e., identify integrity) by using public keys and secret keys of the receiver and the sender.

Meanwhile, due to the recent rise of quantum computers, questions are raised about safety of the existing cryptosystem being used. Accordingly, a lattice-based cryptosystem based on difficulty of problems on lattices has been discussed. As an example, there is post quantum cryptography (PQC).

Although the lattice-based cryptosystem has the advantage of high stability as compared with the cryptosystem in the related art, it has the disadvantage that a lot of resources are used due to the long length of an encryption key, there are many constraints, or the cryptosystem is vulnerable to a side channel attack.

DISCLOSURE

Technical Problem

An object to be solved by the present disclosure is to provide a lattice-based public key cryptosystem and an electronic device included in the cryptosystem.

Technical Solution

A key generation device of a lattice-based public key cryptosystem according to embodiments of the present disclosure includes: a communication unit configured to send and receive data; a storage unit; and a processor configured to control the key generation device to perform a plurality of operations by loading instructions stored in the storage unit, wherein the plurality of operations include: generating a public key by using a public key polynomial belonging to a first polynomial ring that is a quotient ring by a polynomial $\phi(X)$; generating a secret key corresponding to the public key by using a secret key polynomial belong to a second polynomial ring that is a quotient ring by the polynomial $\phi(X)$; and storing the public key and the secret key, wherein the polynomial $\phi(X)$ is $X^p-X-1$ (p is a prime number) or $$X^n - X^{\frac{n}{2}} + 1$$

$(n=2^a 3^b$ (a and b are positive integers)).

A method for operating a key generation device of a lattice-based public key cryptosystem according to embodiments of the present disclosure includes: generating a public key by using a public key polynomial belonging to a first polynomial ring that is a quotient ring by a polynomial $\phi(X)$; generating a secret key corresponding to the public key by using a secret key polynomial belong to a second polynomial ring that is a quotient ring by the polynomial $\phi(X)$; and storing the public key and the secret key, wherein the polynomial $\phi(X)$ is $X^p-X-1$ (p is a prime number) or $$X^n - X^{\frac{n}{2}} + 1$$

$(n=2^a 3^b$ (a and b are positive integers)).

Methods according to embodiments of the present disclosure may be implemented in the form of a program stored in a computer readable storage medium.

Advantageous Effects

The lattice-based electronic signature method according to embodiments of the present disclosure has effects in that it is not vulnerable to various attacks and thus high security can be achieved by discovering and selecting polynomials with less structure that is not easy to be disassembled. Further, in selecting the degrees of polynomials, the parameter selection is flexible in implementing the cryptosystem as compared to the cryptosystem in the related art, and thus the system implementation can be facilitated. In particular, the type of the polynomials used in the lattice-based electronic signature method according to embodiments of the present disclosure is creative and difficult to be easily derived in the existing lattice-based electronic signature method.

DESCRIPTION OF DRAWINGS

FIG. 1 illustrates a public key cryptosystem according to embodiments of the present disclosure.

FIG. 2 illustrates an electronic signature system according to embodiments of the present disclosure.

FIG. 3 illustrates an electronic device according to embodiments of the present disclosure.

FIG. 4 illustrates a key generation method according to embodiments of the present disclosure.

FIG. 5 illustrates a signature method according to embodiments of the present disclosure.

FIG. 6 illustrates a verification method according to embodiments of the present disclosure.

| [Description of reference numerals] | |
| --- | --- |
| 10A: public key cryptosystem | 10B: electronic signature system |
| 100: key generation device | 200: first electronic device |

-continued

[Description of reference numerals]

| 300: second electronic device | PK: public key |
| SK: secret key | |

BEST MODE

Hereinafter, preferred embodiments of the present disclosure will be described in detail with reference to the accompanying drawings.

Embodiments are provided to describe the present disclosure more completely to those of ordinary skill in the art, and the following embodiments may be modified in various different forms, and thus the scope of the present disclosure is not limited to the following embodiments. Rather, these embodiments are provided to make the present disclosure more faithful and complete and to completely transfer the idea of the present disclosure.

The terms used in the description are used to describe specific embodiments, and are not intended to limit the present disclosure. Further, in the description, unless clearly indicated otherwise in context, a singular form may include a plural form.

In describing the embodiments, in case that each layer (film), area, pattern, or structure is described to be formed "on" or "under" each substrate, layer (film), area, pad, or pattern, the terms "on" and "under" include both "direct" or "indirect" forming. Further, the criterion of "on" or "under" each layer is principally based on the drawings.

The drawings are merely to understand the idea of the present disclosure, and it should not be interpreted that the scope of the present disclosure is not limited by the drawings. Further, in the drawings, a relative thickness, length, or size may be exaggerated for convenience and accuracy of the description.

The term "ring" described in the description is one of algebraic structure in which addition and multiplication are defined, and is a structure which is closed for addition, and satisfies the associative law and an identity for multiplication, but an inverse thereof may not exist.

In the description, the term "field" is one of algebraic structure, and means a set which is closed for four basic operations and in which an identity for each of the four basic operations exists. In this case, the term "finite field" means a field having a finite number of elements constituting the field, that is, a field of which the size is finite.

In the description, R[X] means a set of polynomials of X defined on an algebraic structure R. In this case, that a certain polynomial is defined on an algebraic structure R means that coefficients of the polynomial are composed of elements included in the algebraic structure R. Meanwhile, the polynomial of X defined on the R may be expressed as an array or a vector having the coefficients of respective terms (i.e., $X^i$; i is a positive integer) included in the corresponding polynomial as its components. Accordingly, in the following description, a polynomial of X defined on the R may be referred to as a "polynomial" or "vector", which may be used interchangeably.

In the description, if I is called an ideal of a certain ring R, R/I is called a quotient ring of the R. This may be defined in the same manner even for a field F.

In the description, $\mathbb{Z}$ represents a set of integers, and this becomes a field. Meanwhile, $\mathbb{Z}/n\mathbb{Z}$ (n is a natural number) is marked as $\mathbb{Z}_n$, and represents a set of remainders obtained by dividing a certain integer by n, that is, $Z_n=\{0, 1, 2, \ldots, (n-1)\}$. Meanwhile, for convenience, it is defined as $\mathbb{Z} = \mathbb{Z}_\infty$.

In the description, F* means a field including only elements in which inverses for multiplication exist among elements included in a certain field F.

FIGS. 1 and 2 illustrate a public key cryptosystem according to embodiments of the present disclosure. FIG. 1 illustrates a public key cryptosystem, and FIG. 2 is referred to as an electronic signature system. However, embodiments of the present disclosure are not limited thereto, and may also be applied to key encapsulation.

Referring to FIG. 1, a public key cryptosystem 10A includes a key generation device 100, a first electronic device 200, and a second electronic device 300. Each of the electronic devices 100, 200, and 300 includes a processor having an arithmetic processing function, a memory capable of storing data, and a communication circuit capable of sending and receiving data, performs its own operation as the processor executes instructions stored in the memory, and sends and receives data to and from an external device through the communication circuit.

The key generation device 100 may generate a pair of a secret key SK and a public key PK which are used in the public key cryptosystem 10. The secret key SK is a key that is privately provided and used only for a specific user, and the public key PK is a key that can be accessed and used by a certain user. The secret key SK may form a pair with the public key PK.

According to embodiments, the key generation device 100 may receive an input of a security level, and may generate the public key PK and the secret key SK based on the input security level. The security level is a parameter for determining safety of the public key cryptosystem 10, and is a value that is used to set the size (i.e., length of a key; the number of bits) of the public key PK and/or the secret key SK.

The first electronic device 200 is the owner of the secret key SK, and may privately store the secret key SK. That is, the secret key SK is generated to correspond to the first electronic device 200, and is a key that is used for safe communication for the first electronic device 200.

Further, the first electronic device 200 may transmit the public key PK corresponding to the secret key SK to the second electronic device 300. Alternatively, the public key PK of the first electronic device 200 may be transferred (i.e., distributed) to the second electronic device 300 by the key generation device 100.

According to embodiments, the key generation device 100 may be implemented in the first electronic device 200, but the implementation of the key generation device 100 is not limited thereto.

The second electronic device 300 may perform encrypted communication with the first electronic device 200 by using the public key PK. According to embodiments, the second electronic device 300 may generate a message M desired to be transferred to the first electronic device 200, generate an encrypted message PK(M) by encrypting the message M with the public key PK of the first electronic device 200, and transmit the generated encrypted message PK(M) to the first electronic device 200.

The first electronic device 200 may receive the encrypted message PK(M) transmitted from the second electronic device 300, and obtain the message M by decrypting the received encrypted message PK(M) with its own secret key SK. The public key PK and the secret key SK of the first electronic device 200 correspond to each other, and since the encrypted message PK(M) can be decrypted only with the secret key SK of the first electronic device 200, only the first electronic device 200 can identify the message M generated by the second electronic device 300.

That is, in the public key cryptosystem 10A of FIG. 1, the first electronic device 200 becomes a decryption device, and the second electronic device 300 becomes an encryption device.

Referring to FIG. 2, an electronic signature system 10B may include a key generation device 100, a first electronic device 200, and a second electronic device 300. Each of the devices 100, 200, and 300 includes a processor having an arithmetic processing function, a memory capable of storing data, and a communication circuit capable of sending and receiving data, performs its own operation as the processor executes instructions stored in the memory, and sends and receives data to and from an external device through the communication circuit.

In the electronic signature system, a signatory can achieve non-repudiation of the message generated by the signatory himself/herself. That is, the signatory can certify that the corresponding message is generated by the signatory himself/herself by generating an electronic signature for the message by using his/her own secret key.

The key generation device 100 may generate the public key PK and the secret key SK being used in the electronic signature system 10B, and may store the generated public key PK and the secret key SK.

The key generation device 100 may transmit the public key PK to the first electronic device 200 and/or the second electronic device 300. Further, the key generation device 100 may transmit the secret key SK to the first electronic device 200.

The first electronic device 200 may receive the public key PK and/or the secret key SK transmitted from the key generation device 100. The first electronic device 200 may generate an electronic signature σ for the message M by using the secret key SK. According to embodiments, the first electronic device 200 may generate the electronic signature σ for the message M by encrypting the message M with the secret key SK.

Meanwhile, for convenience and security, the first electronic device 200 may generate an electronic signature σ for a hash message H(M) for which a hash function H is applied to the message M instead of the message M. That is, the first electronic device 200 may generate the electronic signature σ by applying the secret key SK to the hash message H(M). According to embodiments, the first electronic device 200 may generate the electronic signature σ from the hash message H(M) by using the secret key, and may transmit the electronic signature σ together with the message M to the second electronic device 300.

The hash function H is a one-way function that makes data of a certain length correspond to data of a fixed length. The hash function H may be made public with respect to the first electronic device 200 and the second electronic device 300.

Meanwhile, the first electronic device 200 may generate a hash message by further including additional data in the message M. Through this, the security of the hash message may be further increased. For example, the first electronic device 200 may generate the hash message H(M,PK), and further, H(H(M,PK), by applying the hash function to both the message M and at least a part of the public key PK. As another example, the first electronic device 200 may generate a hash message H(M,r) by applying a random value r to the message M.

Here, the random value r is an element for further strengthening the safety of the message, and may be a certain variable, information made public in the electronic signature system, or a combination thereof. For example, the random value may be bit data having a length of the security level.

The first electronic device 200 may apply the hash function after concatenating the random value r with a rear end of the message M. Hereinafter, for the above reasons, in the description, the hash message is referred to as the result of applying the hash function with respect to the message or specific data determined in the message.

Hereinafter, for convenience in explanation, explanation will be made under the assumption that the electronic signature is generated based on the message M.

The first electronic device 200 may transmit the message M and the electronic signature σ to the second electronic device 300 for verification of the electronic signature.

Although in FIG. 2, the key generation device 100 and the first electronic device 200 are illustrated as separated device, according to embodiments, the key generation device 100 and the first electronic device 200 may be implemented to be integrated into one device.

For example, the one encryption device may be a device that can perform both functions of the key generation device 100 and the signature device 200. For example, the encryption device may generate the secret key SK and the public key PK, transmit the public key PK to the second electronic device 300, generate the electronic signature a, and transmit the message M and the electronic signature σ to the second electronic device 300.

The second electronic device 300 may receive the public key PK. According to embodiments, the public key PK may be transmitted from the first electronic device 200, but the transmission of the public key PK is not limited thereto. For example, the public key PK may be downloaded from a web server, or may move to and may be stored in a specific storage medium.

The second electronic device 300 may receive and store the message M, the hash message H(M), and the electronic signature σ from the first electronic device 200.

The second electronic device 300 may verify validity of the electronic signature a by using a value obtained by applying the public key PK to the electronic signature σ, that is, a restored message PK(σ) and the message M (or hash value thereof).

The second electronic device 300 may verify the electronic signature by calculating a verification relational expression by using the public key PK, the electronic signature σ, the message M, and other additional data and identifying whether the verification relational expression passes or not. For example, the second electronic device 300 may verify the electronic signature by comparing the value PK(σ) obtained by applying the public key PK to the electronic signature σ, the received message M, and the hash value generated from the additional data with each other.

If the verification relational expression based on the public key PK, the electronic signature σ, the message M, and the other additional data has passed, the second electronic device 300 may verify that the corresponding electronic signature is valid, whereas if the verification relational expression has not passed, the second electronic device 300 may determine that the corresponding electronic signature is not valid. For example, if the value obtained by substituting the electronic signature σ into the public key PK is the same as the hash value H(M), the second electronic device 300 may verify that the corresponding electronic signature is the valid electronic signature. In contrast, if the value obtained by substituting the electronic signature $\sigma$ into the public key PK is not the same as the hash value H(M), the second electronic device 300 may determine that the corresponding electronic signature is not valid.

That is, in the electronic signature system 10B of FIG. 2, the first electronic device 200 becomes the signature device, and the second electronic device 300 becomes the verification device.

According to embodiments of the present disclosure, the public key cryptosystems 10A and 10B may be based on the encryption method based on a lattice structure. That is, the public key cryptosystem 10A may perform encryption according to the encryption method based on the lattice structure, and the electronic signature system 10B may perform the electronic signature according to the encryption method based on the lattice structure.

The lattice-based encryption method is an encryption method based on a lattice-based encryption algorithm. The lattice means a set of points repeatedly disposed at regular spacing and angle, that is, in a lattice form, in an n-dimensional space. Mathematically, the lattice is defined as a set of all possible integer coefficient linear combinations of a plurality of basis vectors belonging to the n-dimensional space. The lattice-based encryption algorithm is based on the difficulty of problems defined on the lattice defined as above.

Exemplarily, the lattice-based encryption algorithm may include an encryption algorithm based on learning with errors (LWE) problem, learning with rounding (LWR) problem, and short integer solution (SIS) problem, but the embodiments of the present disclosure are not limited to a specific type of problem.

The public key cryptosystem according to embodiments of the present disclosure may be based on the encryption algorithm based on the ring-LWE problem defined in the lattice structure. That is, the stability of the public key cryptosystem is based on the difficulty of the LWE problem defined in the ring.

The public key encryption method according to embodiments of the present disclosure may be performed in the lattice structure defined in the polynomial ring. According to embodiments, the polynomial ring is a quotient ring by a polynomial $\phi(X)$ of $\mathbb{Z}_\ast[X](k=1, 2, \ldots, \infty)$, and the polynomial $\phi(X)$ may be $X^p-X+1$ (p is a prime number) or $X^n-X^{n/2}-1$ ($n=2^a3^b$ (a and b are positive integers)).

For example, the polynomial ring may be a first polynomial ring $R_q$ or a second polynomial ring R defined according to Mathematical expression 1 below.

$$R_q = \mathbb{Z}_q[X]/(X^p - X - 1) \qquad \text{[Mathematical expression 1]}$$

$$R = \mathbb{Z}[X]/(X^p - X - 1)$$

Here, q is a prime number that makes $R_q$ become a field.

Further, alternatively, the polynomial ring may be a first polynomial ring $R_q$ or a second polynomial ring R defined according to Mathematical expression 2 below.

$$R_q = \mathbb{Z}_q[X]/\left(X^n - X^{\frac{n}{2}} + 1\right) \qquad \text{[Mathematical expression 2]}$$

$$R = \mathbb{Z}[X]/\left(X^n - X^{\frac{n}{2}} + 1\right)$$

Here, q may be a certain positive integer. Preferably, q may be $q=2^k$ (k is a positive integer). Meanwhile, $n=2^a3^b$ (a and b are positive integers).

That is, in FIGS. 1 and 2, the public key PK and the secret key SK which are used by the electronic devices 100, 200, and 300 may be generated based on the polynomials defined on the polynomial rings defined according to Mathematical expression 1 and Mathematical expression 2 as above.

In case of the lattice-based cryptosystem in the related art, for example, the electronic signature system, the polynomial $\phi(X)$ that is an ideal of the polynomial ring adopts $X^n+1$ (n is a power of 2) form or $X^p-1$ (p is a specific prime number) form. This system has the advantage that it can achieve the security compared with the efficient key size and the fast computation speed. However, in case that the polynomial $\phi(X)$ in the method in the related art is decomposed into two or more polynomials, it may be vulnerable to an attack, and further, even in case that a quotient algebraic structure (quotient ring or quotient field) based on the polynomial $\phi(X)$ has a sub algebraic structure, there is a problem in that it may be vulnerable to an attack, an attack using the property of a related Galois group, an attack using a ring homomorphism of a related ring, and an attack specialized to the corresponding polynomial.

The cryptosystem 10A and 10B according to embodiments of the present disclosure has effects in that it is not vulnerable to the attacks as described above and thus high security can be achieved by discovering and selecting the polynomial $\phi(X)$ with less structure that is not easy to be disassembled. Further, in selecting various parameters of the cryptosystem, such as selecting the degrees of polynomials, the parameter selection is flexible as compared with the cryptosystem in the related art, and thus the system implementation can be facilitated. In particular, the type of the polynomials used in the cryptosystem according to embodiments of the present disclosure is creative and difficult to be easily derived in the existing lattice-based cryptosystem.

FIG. 3 illustrates an electronic device according to embodiments of the present disclosure. Referring to FIG. 3, the device 400 may be represented as any one of a key generation device 100, a first electronic device 200, and a second electronic device 300.

The device 400 may include a communication circuit 410, a memory 420, and a processor 430.

The communication circuit 410 may send and receive data with an external device. According to embodiments, the communication circuit 410 may send and receive data in accordance with a wired communication protocol or a wireless communication protocol. For example, the communication circuit 410 may send and receive data that is used in the cryptosystems 10A and 10B, such as keys PK and SK, hash function H, message M, and electronic signature 6.

The memory 420 may store data necessary for the operation of the device 400. According to embodiments, the memory 420 may store a program including instructions for performing at least one of a key generation operation, encryption operation, decryption operation, electronic signature generation operation, and electronic signature verification operation. The device 400 may perform a series of operations by executing the program stored in the memory 420.

The memory 420 may be a volatile memory or a non-volatile memory.

The processor 430 may control the overall operation of the device 400. According to embodiments, the processor 430 may perform a specific operation with an arithmetic processing function. For example, the processor 430 may execute the program stored in the memory 420, and may perform a series of operations indicated by the instructions included in the program in accordance with the execution.

For example, the processor 430 may be any one of a central processing unit (CPU), micro controller unit (MCU), field programmable gate array (FPGA), application specified integrated circuit (ASIC), and graphic processing unit (GPU), but the embodiments of the present disclosure are not limited thereto.

The operation of the device 400 according to embodiments of the present disclosure may be implemented in the form of a program stored in a computer-readable nonvolatile storage medium.

FIG. 4 is a diagram explaining a key generation method that is used in a lattice-based cryptosystem according to embodiments of the present disclosure. The key generation method to be described with reference to FIG. 4 may be used in the public key cryptosystem of FIG. 1 and the electronic signature system of FIG. 2. Meanwhile, the key generation method of FIG. 4 is one of various examples of the key generation method that can be used in a lattice structure according to embodiments of the present disclosure, and the embodiments of the present disclosure are not limited to a specific key generation method. The same applies below.

That is, since the embodiments of the present disclosure relate to an encryption method (or cryptosystem) using a specific lattice structure (e.g., based on Mathematical expression 1 or Mathematical expression 2), the scope of the present disclosure is about the whole encryption method using the above specific lattice structure, but is not limited to a detailed method or system concretely realizing the encryption method.

Referring to FIG. 4, the key generation device 100 may generate a public key PK and a secret key SK. The key generation device 100 may select certain polynomials belonging to a polynomial ring, and may generate the public key PK and the secret key SK by using the selected polynomials. Hereinafter, this will be explained in detail.

The key generation device 100 may generate the polynomials (S110). According to embodiments, the key generation device 100 may generate a first public key polynomial a and a secret key polynomial s which belong to the polynomial ring defined according to Mathematical expression 1 or Mathematical expression 2. For example, the key generation device 100 may generate the first public key polynomial a belonging to a first polynomial ring, and may generate the secret key polynomial s belonging to a second polynomial ring. According to embodiments, the secret key polynomial s may be generated from the first polynomial ring.

According to embodiments, the key generation device 100 may generate the polynomials a and s so that the size of the secret key polynomial s is smaller than the size of the first public key polynomial a. For example, the key generation device 100 may select a certain public key polynomial a belonging to the first polynomial ring, and may select the secret key polynomial s among the polynomials in which the maximum size of the coefficients of the respective terms is within the reference value among the polynomials included in the second polynomial ring.

Meanwhile, in the description, the fact that the key generation device 100 generates (or selects) the polynomial on the polynomial ring may mean that the key generation device 100 determines the degrees of the polynomials and the coefficients of the respective terms. In other words, it may mean that the key generation device 100 generates a ring-shaped array in which respective components represent the coefficients of the respective terms of the polynomial on the polynomial ring.

Further, in the description, generation of the polynomial (or vector) may be performed by a specific function. In this case, the specific function may make a certain variable that is called a seed as its input. The seed is a factor that exerts an influence (e.g., influence such as uniqueness) on the generation of the polynomial (or vector), and for example, if the seed is changed, the outputted (i.e., generated) polynomial may be changed even in case of the same function. The seed may be of 256 bits, but is not limited thereto.

From such a viewpoint, the first public key polynomial a and the secret key polynomial s may be generated from a public key seed $\zeta$ and a secret key seed $\xi$ as in Mathematical expression 3 below.

$$\alpha = f(\zeta), \quad s = g(\xi) \qquad \text{[Mathematical expression 3]}$$

The key generation device 100 generates a second public key polynomial by combining the first public key polynomial a and the secret key polynomial s (S120). According to embodiments, the key generation device 100 may generate a second public key polynomial t according to Mathematical expression 4 below.

$$t = as \qquad \text{[Mathematical expression 4]}$$

According to embodiments, the key generation device 100 may generate two part public key polynomials from the generated second public key polynomial t, and may use a first part public key polynomial as the public key to reduce the size of the public key. This is called public key compression. Meanwhile, a second part public key polynomial may be used as the secret key.

In this case, the key generation device 100 may generate the first part public key polynomial and the second part public key polynomial by using a lower bit expression and an upper bit expression among respective bit expressions of the coefficients of the respective terms of the second public key polynomial t. That is, the first part public key polynomial may be a polynomial having the lower bit expression (e.g., bit expression below the basic d-th bit) among the bit expressions of the coefficients of the respective terms of the second public key polynomial t as the coefficient of each term, and the second part public key polynomial may be a polynomial having the upper bit expression (e.g., bit expression above the basic (d+1)-th bit) among the bit expressions of the coefficients of the respective terms of the second public key polynomial t as the coefficient of each term.

The key generation device 100 may generate the public key PK by using the first public key polynomial a and the second public key polynomial t (S130). That is, two public key polynomials a and t may be made public and distributed as the public key PK.

According to embodiments, the key generation device 100 may generate a public key PK further including the public key seed $\zeta$. In this case, a person having received the public key PK may restore the first public key polynomial a by using the public key seed $\zeta$. Of course, the function for generating the first public key polynomial a may also be made public from the public key seed $\zeta$.

The key generation device 100 may generate the secret key SK by using the secret key polynomial s (S140). That is, the secret key polynomial s may be kept secret, and may be stored only in the first electronic device 200.

According to embodiments, the key generation device 100 may generate the secret key SK that further includes the public key seed $\xi$ in addition to the secret key polynomial s. Further, as described above, in case of using the public key compression, the public key polynomial corresponding to the upper bit, that is, the first part public key polynomial, may be included in the public key PK, and the public key polynomial corresponding to the lower bit, that is, the second part public key polynomial, may be included in the secret key SK. Although the second part public key polynomial is generated from the second public key polynomial t, it may not be publicly distributed, but may be kept secret.

FIG. 5 is a diagram explaining a signature method that is used in a lattice-based electronic signature system according to embodiments of the present disclosure. The signature method of FIG. 5 is one of various examples of the signature method that can be used in a lattice structure according to embodiments of the present disclosure, and the embodiments of the present disclosure are not limited to a specific signature method.

Referring to FIG. 5, the first electronic device 200 generates a masking polynomial y (S210). According to embodiments, the first electronic device 200 may generate a random masking polynomial y.

The first electronic device 200 calculates a composite polynomial w (S220). According to embodiments, the first electronic device 200 may calculate the first public key polynomial a by using a public key seed included in the secret key SK, and may calculate a composite polynomial w=ay by applying the first public key polynomial a to the masking polynomial y.

The first electronic device 200 generates a challenge polynomial c (S230). According to embodiments, the first electronic device 200 may determine a challenge seed $\check{c}$, and may generate the challenge polynomial c based on the challenge seed $\hat{c}$. For example, the challenge polynomial c may be the result of converting the challenge seed $\hat{c}$ into the polynomial through a proper function. Accordingly, in case of knowing a proper function and the challenge seed $\check{c}$, the challenge polynomial c can be calculated.

The challenge seed $\check{c}$ may be a hash value of information related to the message (or hash message) and the public key PK. For example, the first electronic device 200 may generate the challenge seed $\check{c}$ according to Mathematical expression 5 below.

$$\check{c} = H(w, M) \qquad \text{[Mathematical expression 5]}$$

Here, H is a hash function, M is a message, and w is a composite polynomial. In this case, in calculating the challenge seed through Mathematical expression 5 above, the public key PK, the hash value of the public key PK, or other public data may be additionally used in addition to the composite polynomial w and the message M. For example, the public key seed and the first public key polynomial a (or the hash value thereof) may be additionally or alternatively used. Meanwhile, according to embodiments, the first electronic device 200 may evaluate the masking polynomial y and the challenge polynomial c. For example, the first electronic device 200 determines whether the masking polynomial y and the challenge polynomial c satisfy a specific condition, and if the specific condition is not satisfied, the first electronic device 200 may regenerate the masking polynomial y and the challenge polynomial c. In this case, the seed for generating the masking polynomial y and the challenge polynomial c may be changed.

According to embodiments, the specific condition may be a condition about the range of coefficients of the masking polynomial y and the challenge polynomial c, but is not limited thereto.

The first electronic device 200 generates a signature polynomial z (S240). According to embodiments, the first electronic device 200 may generate the signature polynomial z based on the masking polynomial y, the challenge polynomial c, and the secret key polynomial s. For example, the first electronic device 200 may generate the signature polynomial z according to Mathematical expression 6 below.

$$z = y + cs \qquad \text{[Mathematical expression 6]}$$

The first electronic device 200 may store the electronic signature including the challenge seed $\check{c}$ and the signature polynomial z, and may transmit the electronic signature to the second electronic device 300. In this case, the message may also be transmitted together with the electronic signature.

Meanwhile, according to embodiments, the first electronic device 200 may evaluate whether the challenge polynomial c and/or the signature polynomial z satisfy a specific condition. In this case, if the challenge polynomial c and/or the signature polynomial z do not satisfy the specific condition, the first electronic device 200 may regenerate the challenge polynomial c and/or the signature polynomial z until the corresponding specific condition is satisfied. The specific condition may be related to safety or efficiency of the electronic signature system.

Meanwhile, in case of using the above-described public key compression, the secret key polynomial s may also be divided into two part secret key polynomials based on the bit expression of the secret key polynomial s (e.g., like generation of two part public key polynomials from the second public key polynomial). However, in this case, for authenticity of the signature polynomial z, information (hint) about the secret key polynomials may be provided together with the signature polynomial z.

FIG. 6 is a diagram explaining a verification method that is used in a lattice-based electronic signature system according to embodiments of the present disclosure. Meanwhile, the verification method of FIG. 6 is one of various examples of the verification method that can be used in a lattice structure according to embodiments of the present disclosure, and the embodiments of the present disclosure are not limited to a specific verification method.

Referring to FIG. 6, the second electronic device 300 receives the electronic signature including the challenge seed $\check{c}$ and the signature polynomial z (S310). According to embodiments, the electronic signature may be transmitted from the first electronic device 200.

The second electronic device 300 generates a hash message (i.e., hash value) (S320). According to embodiments, the second electronic device 300 may receive the message from the first electronic device 200, and may generate the hash message by using the public key. In this case, the second electronic device 300 generates the hash message by using the message and information related to the public key PK in the same manner as the first electronic device 200, and if the public key PK and the message M are true, the hash message generated by the second electronic device 300 becomes the same as the hash message generated and received by the first electronic device 200.

The second electronic device 300 generates the challenge polynomial (S330). According to embodiments, the second electronic device 300 may calculate the challenge polynomial c by using the challenge seed included in the electronic signature.

The second electronic device 300 verifies the electronic signature by using the public key PK, the challenge polynomial and the electronic signature (S340). According to embodiments, the second electronic device 300 may verify the electronic signature by determining whether the value calculated according to Mathematical expression 7 below is the same as the received challenge polynomial c.

$$H(az - ct, M) \qquad \text{[Mathematical expression 7]}$$

That is, if the resultant value of Mathematical expression 7 above is the same as the challenge seed included in the electronic signature, the second electronic device 300 may determine that the electronic signature has been verified as valid. Further, in addition, in case that the first electronic device 200 generates the challenge seed satisfying the specific condition, the second electronic device 300 may also verify the electronic signature by additionally determining whether the resultant value of the above Mathematical expression 7 satisfies the same specific condition as described above.

Further, alternatively, in case of using the above-described public key compression method, any one of the part public key polynomials may be used instead of the second public key polynomial t in the above Mathematical expression 7.

According to embodiments of the present disclosure, it is possible to achieve the electronic signature method having the effects in that it is not vulnerable to the attacks and thus has high security by discovering and selecting the polynomials φ(X) (e.g., Mathematical expression 1 and Mathematical expression 2) with less structure that is not easy to be disassembled.

The above explanation of the present disclosure is merely for exemplary explanation of the technical idea of the present disclosure, and it can be understood by those of ordinary skill in the art to which the present disclosure pertains that various corrections and modifications thereof will be possible in a range that does not deviate from the essential characteristics of the present disclosure. Accordingly, it should be understood that the embodiments disclosed in the present disclosure are not to limit the technical idea of the present disclosure, but to explain the same, and thus the scope of the technical idea of the present disclosure is not limited by such embodiments. The scope of the present disclosure should be interpreted by the appended claims to be described later, and all technical ideas in the equivalent range should be interpreted as being included in the scope of the present disclosure.

The device (unit) described as above may be implemented by hardware elements and software elements. For example, the hardware elements may include a microphone, an amplifier, a band-pass filter, an A/D converter, and a processing device. The processing device, for example, may be implemented by using one or more general purpose computers or special purpose computers, like a processor, controller, arithmetic logic unit (ALU), digital signal processor, microcomputer, field programmable gate array (FPGA), programmable logic unit (PLU), microprocessor, or other devices capable of responding to instructions in a defined manner and executing the instructions. The processing device may operate an operating system (OS) and one or more software applications operating on the operating system. Further, the processing device may access, store, operate, process, and generate data in response to execution of the software. For brief description, it may be described that one processing device is provided, but it will be apparent to those of ordinary skill in the art to which the present disclosure pertains that a plurality of processing elements and/or plural types of processing elements can be included. For example, the processing device may include a plurality of processors or a plurality of processors and controllers. Further, other processing configuration, such as a parallel processor, is also possible.

The software includes a computer program, a code, instructions, or a combination thereof, and may configure processing devices independently or collectively or command the processing device so as to operate as desired. The software and data may be interpreted by the processing device, or may be embodied permanently or temporarily in propagated signal waves that can provide the instructions or data or in various types of machines, components, physical devices, virtual equipment, computer storage media or devices. The software may be dispersed on a computer system connected to a network, and may be stored and executed in a dispersed method. The software and data may be stored in one or more computer-readable recording media, and may include a data storage device in which the data is stored, and from which the computer system or the processing device can read the data thereafter. The method according to embodiments may be implemented in the form of a program instructions capable of being performed through various computer means, and may be recorded in the computer-readable medium. Examples of the computer-readable recording medium include a ROM, RAM, CD-ROM, magnetic tape, floppy disk, and optical data storage device. Hardware devices specially configured to store and perform program instructions, such as magnetic media such as hard disk, floppy disk, and magnetic disk, optical media such as CD-ROM and DVD, magneto-optical media such as floptical disk, ROM, RAM, and flash memory, may be included. Further, functional programs, codes, code segments to complete the examples disclosed herein may be easily understood and implemented by a programmer having an ordinary knowledge in the technical field related to the examples based on the explanation provided herein in relation to flowcharts and block diagrams of the drawings or by using the same.

Although may not be applied overall, the terminal or the device described herein may be applied to a cellular phone, PDA, digital camera, portable game console, MP3 player, portable/personal multimedia player (PMP), portable e-book, portable lap-top PC, GPS navigation, tablet, mobile device such as sensor, desk-top PC, HDTV, optical disk player, set-top box, home appliance, and devices capable of performing wireless communication or network communication.

Further, the computer-readable medium may include program instructions, data files, and data structure singly or in combination. The program instructions recorded in the medium may be specially designed and configured for the embodiments, or may be known to public and available by a computer software skilled person. Examples of the program instructions include not only machine codes made by a compiler but also high-level language codes that can be executed by the computer using an interpreter and the like. The hardware device may be configured to operate as one or more software modules to perform the operations of the embodiments, and vice versa.

Although several embodiments have been described as described above, it should be understood that various modifications are possible. For example, although the above-described technologies are performed in different orders, and/or elements of the described system, structure, device, and circuit are combined in different methods, or are replaced or replenished by other elements or equivalents, proper results can be achieved. Accordingly, other implementations belong to the scope of the appended claims.

The invention claimed is:

1. A key generation device of a lattice-based public key cryptosystem, the key generation device comprising:

a communication circuit configured to send and receive data;

a memory; and a processor coupled to the communication circuit and the memory, and configured to control the key generation device to perform a plurality of operations by loading instructions stored in the memory, wherein the plurality of operations include:

obtaining a public key seed and a secret key seed;

generating a public key polynomial belonging to a first polynomial ring that is a quotient ring by a polynomial $\phi(X)$, by determining a degree and coefficients of the public key polynomial according to the public key seed;

generating a public key based on the public key polynomial;

generating a secret key polynomial belong to a second polynomial ring that is a quotient ring by the polynomial $\phi(X)$, by determining a degree and coefficients of the secret key polynomial from the secret key seed; and generating a secret key based on the secret key polynomial;

storing the public key and the secret key, wherein the polynomial $\phi(X)$ is defined as $X^p-X-1$ (p is a prime number) or $$X^n - X^{\frac{n}{2}} + 1$$

($n=2^a 3^b$ (a and b are positive integers)) such that the public key and the secret key are secure against attacks based on decomposition of the polynomial $\phi(X)$.

2. The key generation device of claim 1, wherein the generating of the public key comprises:

generating a first public key polynomial defined on the first polynomial ring;

generating a secret key polynomial defined on the second polynomial ring;

generating a second public key polynomial by using the first public key polynomial and the secret key polynomial; and generating the public key by using the first public key polynomial and the second public key polynomial.

3. The key generation device of claim 2, wherein the generating of the secret key further comprises:

generating a first secret key polynomial and a second secret key polynomial from the secret key polynomial; and generating the secret key by using the first secret key polynomial and the second secret key polynomial.

4. The key generation device of claim 3, wherein the generating of the first secret key polynomial and the second secret key polynomial comprises:

selecting the first secret key polynomial and the second secret key polynomial among polynomials in which a maximum size of coefficients of respective terms is within a reference value among polynomials included in the second polynomial ring.

5. The key generation device of claim 2, wherein the generating of the public key further comprises:

generating a first part public key polynomial and a second part public key polynomial based on each of coefficients of the second public key polynomial; and generating the public key by using any one of the first part public key polynomial and the second part public key polynomial.

6. The key generation device of claim 1, wherein the first polynomial ring is $Z_q[X]/X^p-X-1$) (here, q is a prime number making the first polynomial ring become a field), and wherein the second polynomial ring is $Z[X]/(X^p-X-1)$.

7. The key generation device of claim 1, wherein the first polynomial ring is $$\mathbb{Z}_q[X]/\left(X^n - X^{\frac{n}{2}} + 1\right)$$

(here, q is a prime number making the first polynomial ring become a field), and wherein the second polynomial ring is $$\mathbb{Z}[X]/\left(X^n - X^{\frac{n}{2}} + 1\right).$$

8. A method for operating a key generation device of a lattice-based public key cryptosystem, the method comprising:

obtaining a public key seed and a secret key seed;

generating a public key polynomial belonging to a first polynomial ring that is a quotient ring by a polynomial $\phi(X)$, by determining a degree and coefficients of the public key polynomial according to the public key seed;

generating a secret key polynomial belong to a second polynomial ring that is a quotient ring by the polynomial $\phi(X)$, by determining a degree and coefficients of the secret key polynomial according to the secret key seed; and generating a public key based on the public key polynomial and the secret key polynomial;

generating a secret key based on the secret key polynomial; and storing the public key and the secret key, wherein the polynomial $\phi(X)$ is defined as $X^p-X-1$ (p is a prime number) or $$X^n - X^{\frac{n}{2}} + 1$$

(n=2a3b (a and b are positive integers)) such that the public key and the secret key are secure against attacks based on decomposition of the polynomial $\phi(X)$.

9. The method of claim 8, wherein the generating of the public key comprises:

generating a first public key polynomial defined on the first polynomial ring;

generating a secret key polynomial defined on the second polynomial ring;

generating a public key polynomial by using the first public key polynomial and the secret key polynomial; and generating the public key by using the public key polynomials.

10. A computer-readable non-transitory storage medium storing a program for performing the method described in claim 9.

11. The method of claim 8, wherein the first polynomial ring is $Z_q[X]/(X^p-X-1)$ (here, q is a prime number making the first polynomial ring become a field), and wherein the second polynomial ring is $Z[X]/X^p-X-1)$.

12. The method of claim 8, wherein the first polynomial ring is $$\mathbb{Z}_q[X]/\left(X^n - X^{\frac{n}{2}} + 1\right)$$

(here, q is a prime number making the first polynomial ring become a field), and wherein the second polynomial ring is $$\mathbb{Z}[X]/\left(X^n - X^{\frac{n}{2}} + 1\right).$$

* * * * *